May 3, 1966  S. V. CHELMINSKI  3,249,177
ACOUSTIC WAVE IMPULSE GENERATOR REPEATER
Filed Nov. 13, 1961  4 Sheets-Sheet 1

INVENTOR.
STEPHEN V. CHELMINSKI
BY
Robertson & Smythe
ATTORNEYS.

May 3, 1966  S. V. CHELMINSKI  3,249,177
ACOUSTIC WAVE IMPULSE GENERATOR REPEATER
Filed Nov. 13, 1961  4 Sheets-Sheet 2

INVENTOR.
STEPHEN V. CHELMINSKI
BY
Robertson and Smythe
ATTORNEYS.

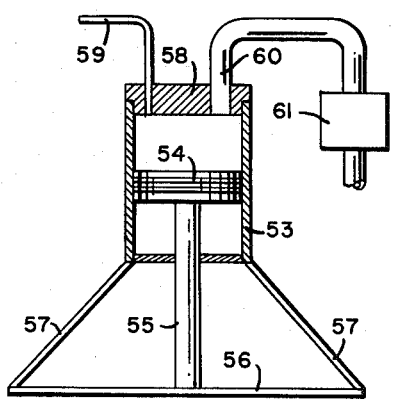
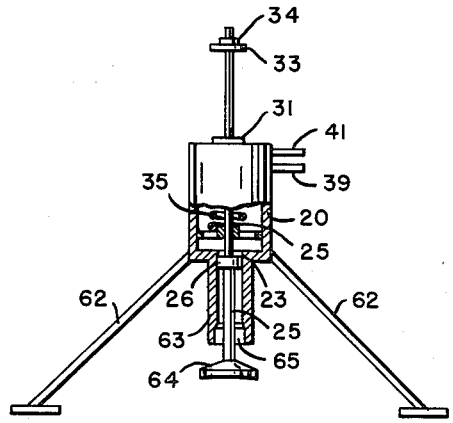
FIG. 8   FIG. 9
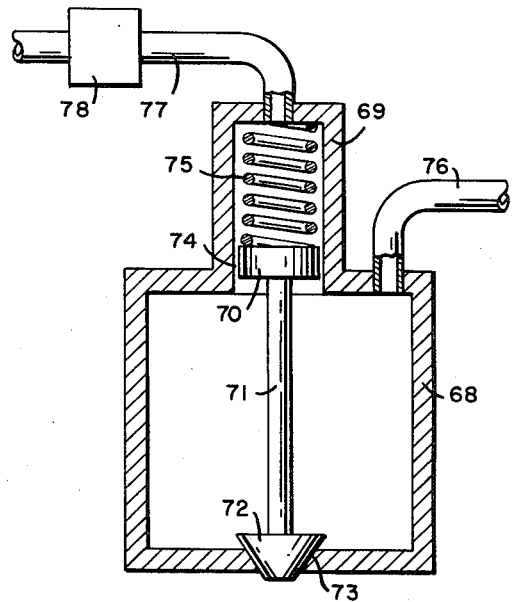
FIG. 11

United States Patent Office 3,249,177
Patented May 3, 1966

3,249,177
ACOUSTIC WAVE IMPULSE GENERATOR
REPEATER
Stephen V. Chelminski, Redding, Conn., assignor, by mesne assignments, to Bolt Associates, Inc., East Norwalk, Conn., a corporation of Connecticut
Filed Nov. 13, 1961, Ser. No. 151,853
25 Claims. (Cl. 181—.5)

The present invention relates to the art of sound instrumentation, and particularly to a new and improved pneumatic acoustical repeater.

While the principles of the invention are applicable to acoustical repeaters for various uses, they are disclosed and will be described as applied to underwater sound instrumentation such as oceanographic equipment that is employed in seismic exploration of the world's crust under bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the substrata.

While explosives for marine seismic work can put more energy into the water and obtain greater depth of penetration than other means available today, they do have drawbacks; they are dangerous to handle and use, and in some areas such as congested harbors, they cannot be used at all. Also, each "shot" costs money which can run into many thousands of dollars per survey.

The principal object of the present invention is to provide a device capable of emitting a large amount of acoustical energy into the water in the form of a clean, repeatable pulse, the frequency and amplitude of which may be readily varied.

Still another object of the present invention is to provide such a device in which compressed air as a source of acoustical energy is employed.

Another object of the invention is to provide such a device in which a large amount of noise can be produced with a relatively small device.

Still another object of the invention is to provide such a device in which no parts are subjected to heavy wear.

In one aspect of the invention, a cylinder may be provided having aligned pistons that simultaneously close aligned ports in the end walls of the cylinder. The pistons may be fixedly mounted on a piston rod that extends beyond the one end of the cylinder and through an end cap that forms a chamber, separate from the the cylinder. The separate chamber is open to the face of one of the pistons and acts to limit the extent of movement of the piston rod in one direction.

In another aspect of the invention, an adjustable stop may be fixed to the extended end of the piston rod and it limits the movement of the piston rod in its other direction of motion.

In still another aspect of the invention, the diameter of the piston closing the port in the one end of the cylinder may be smaller than that of the piston closing the port in the end adjacent the separate chamber. Compressed air lines may lead from both the cylinder and the separate chamber through a solenoid valve to a high pressure compressor through a flexible line of any desired length. Resilient means may be employed normally to move the pistons into position closing the ports in the end walls of the cylinder.

With the separate chamber vented, compressed air under any predetermined pressure may be pumped into the cylinder through the solenoid valve and a condition will exist within the cylinder in which the piston means therein closes both ports. Upon operating the solenoid valve such that communication is established between the cylinder and separate chamber, the pressure within the cylinder acts on both faces of the piston within the end wall between the cylinder and separate chamber so that the other piston is effective to open the port in the other end wall. This suddenly releases the high-pressure air within the cylinder and causes an intense sound wave that will be transmitted through the medium within which the device is submerged.

Operating the solenoid valve to vent the separate chamber and re-establishing the compressed air line to the cylinder cause the return of the pistons to the position where the ports in both end walls are closed and the device is ready to be recharged and discharged again.

The above, other objects and novel features of the invention will become apparent from the following specification and accompanying drawings which are merely exemplary.

Figure 10:
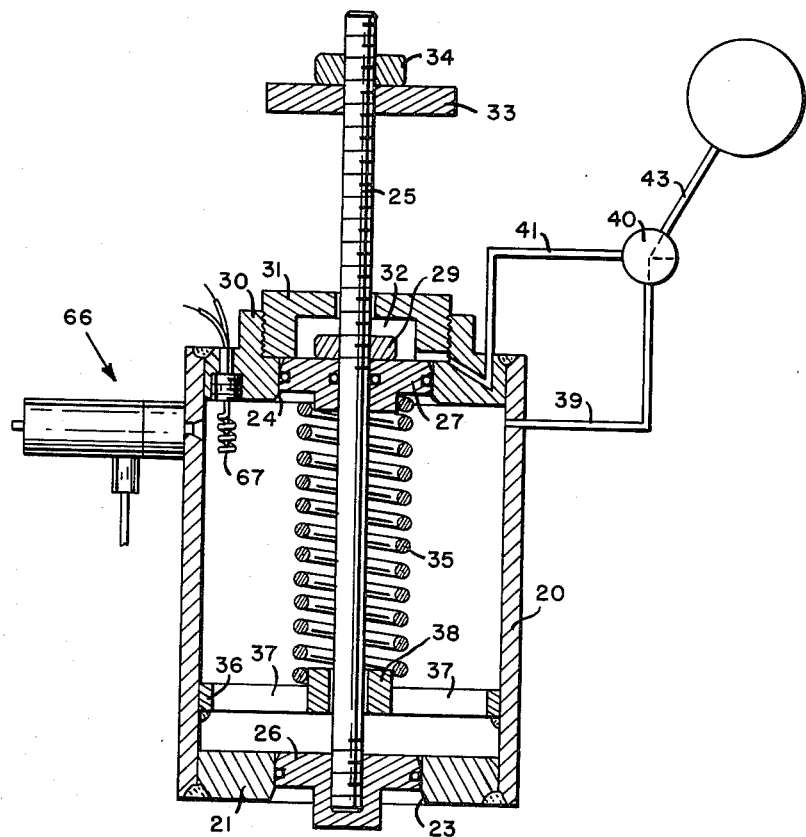

FIGS. 3 to 8, inclusive, are elevational views of various modified types of acoustical devices to which the principles of the invention have been applied;

FIG. 9 is still another modified form of the apparatus;

FIG. 10 is another modified form of the apparatus;

FIG. 11 is another modified form of the apparatus; and

Figure 12:
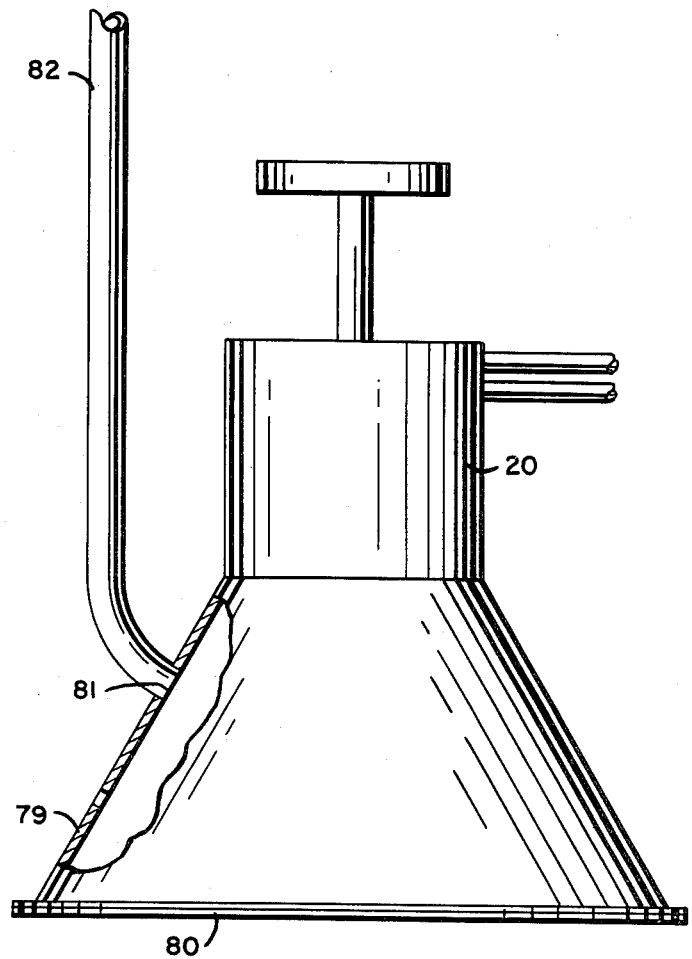

FIG. 12 is another modified form of the apparatus.

Figure 2:
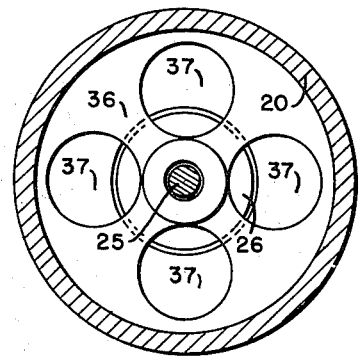
FIG. 2 is a sectional plan view taken substantially along line 2—2 of FIG. 1.
Figure 1:
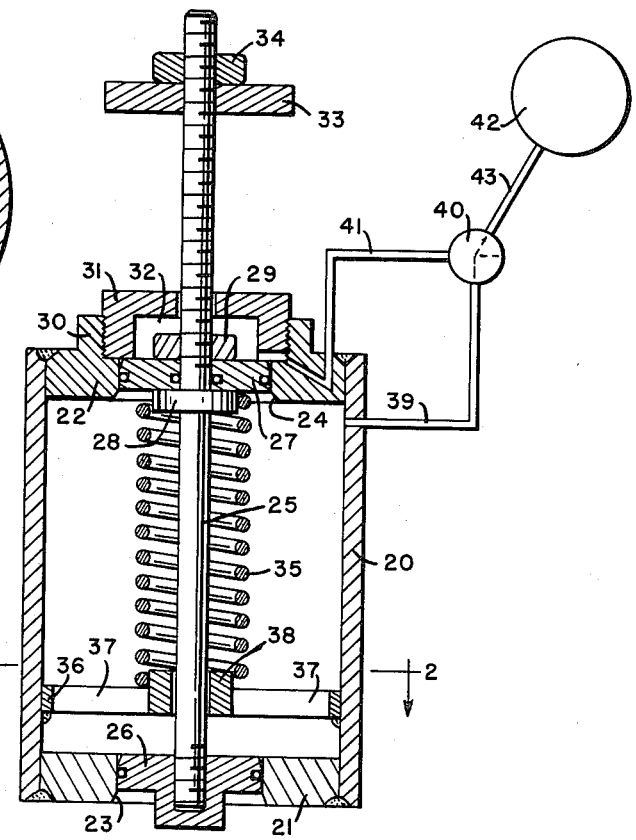
FIG. 1 is a sectional elevational view of a pneumatic acoustical device to which the principles of the invention have been applied.

Referring to the drawings, and particularly to FIGS. 1 and 2, the principles of the invention are shown as applied to a pneumatic acoustical device comprising a cylinder 20 having end walls 21 and 22. Ports 23 and 24 are provided within the end walls 21 and 22 and they are in axial aligned relation. The port 23 is of somewhat smaller diameter than that of port 24 for a purpose to be described later. A piston rod 25 may extend through the cylinder 20, and it may support pistons 26 and 27 spaced therealong so that in one axial position of rod 25, pistons 26 and 27 close ports 23 and 24, and in another position open said ports. The piston 26 may be threaded onto the end of the rod 25, while the piston 27 may be rigidly held against a collar 28 on rod 25 by a nut means 29 threaded onto rod 25.

The end wall 22 may include an internally threaded flange 30 for receiving a hollow cap member 31 that forms a chamber 32 having its one side closed by piston 27 when the latter is in its uppermost position. The wall of the cap 31 may overlie the piston 27 thereby to limit its movement in one direction.

The piston rod 25 may extend upwardly above the end cap 31 and may have an adjustable stop 33 held thereto by a jam nut 34. A spring 35 within cylinder 20 may act against one surface of piston 27 and a disk 36, which latter may adjustably be fixed at a predetermined location within the cylinder 20 by means (not shown) fixing it to the side walls thereof. The disk 36 may be provided with large passages 37 therethrough so as not to interfere with the free flow of fluid from one to the other side thereof. The piston rod 25, of course, makes a sliding fit with a bored boss 38 of the disk 36. From the foregoing it is evident that spring 35 normally assists in the return of the piston rod 25 and pistons 26 and 27 to the position shown in FIG. 1.

The cylinder 20 may be connected by a line 39 to a solenoid operated valve 40. The chamber 32 may also be connected through a line 41 to the valve 40, and the valve 40 may be connected to a high-pressure compressor 42 through a flexible line 43.

With the apparatus in the condition shown in FIG. 1, with chamber 32 vented through the valve 40 and line 43 connected to line 39 through valve 40, fluid under a great pressure may be supplied to the cylinder 20. Since piston 27 is of greater area than that of piston 26, the apparatus remains in the condition shown in FIG. 1.

Upon operating the solenoid valve to connect chamber 32 with cylinder 20, the pressure on each side of piston 27 is equalized, causing the piston 26 and rod 25 to move downwardly very rapidly, permitting the very rapid escape of the pressure fluid in cylinder 20 through port 23, which action produces an acoustical wave of great intensity. Operating valve 40 to vent chamber 32 causes spring 35 to return the rod 25 and pistons 26, 27 to the position shown in FIG. 1, and reconnecting line 43 to line 39 through valve 40 recharges cylinder 20 preparatory to producing another acoustical wave.

Figure 3:
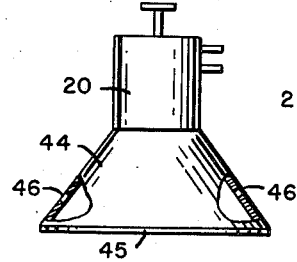

Referring to FIG. 3, the apparatus shown in FIG. 1 is attached to a conical member 44 at its apex. The conical member 44 may be provided with a plate or diaphragm 45, and orifices 46 may be provided for permitting the escape of the pressure fluid that exhausts from the cylinder 20 after the acoustical sound wave is produced in the same way that it is produced with the structure of FIG. 1.

Figure 4:
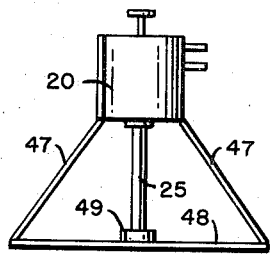

Referring to FIG. 4, the device of FIG. 1 is shown at attached to support struts 47, to the bottom of which may be attached a plate or diaphragm 48. The piston rod 25 of the disclosure of FIG. 3 is extended beyond the cylinder 20 and terminates in a member 49 that may be fixed to the center of the plate 48.

Figure 5:
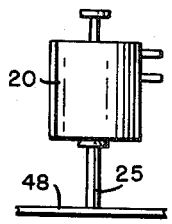

The embodiment shown in FIG. 5 is similar to that shown in FIG. 4, except that the support struts 47 are eliminated.

Figure 6:
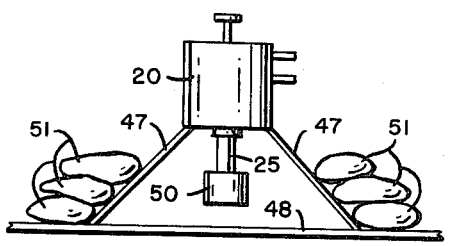

In FIG. 6, the shaft 25 is fixed to a relatively heavy mass 50, and the device is shown as being anchored by weights 51 to overcome its tendency to rise when the cylinder 20 is triggered.

Figure 7:
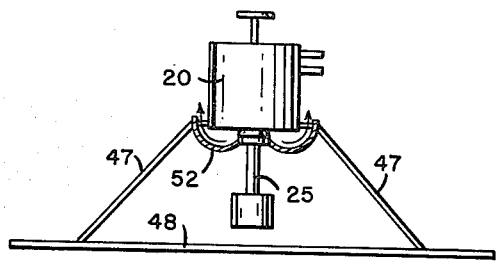

The embodiment of FIG. 7 includes a deflector 52 of annular form having curved walls for directing the exhausting fluid from cylinder 20 upwardly, thereby causing it to react on liquid within which the device may be submerged and accordingly avoiding the necessity of employing the anchor weights 51 of FIG. 6.

Referring to FIG. 8, a cylinder 53 may have a piston 54 mounted therein for reciprocation. A piston rod 55 may extend from one end of the cylinder 53 and may be connected to a diaphragm or plate 56. The plate 56 may be fixed at its periphery to support struts 57 which, in turn, are connected to one end of cylinder 53. The opposite end of the cylinder 53 may be closed by an end plate 58 having a relatively small diameter inlet 59 that may be connected to a compressor or the like. The plate 58 may also include an exhaust port 60 of much greater cross sectional area than that of inlet 59. The exhaust port 60 may be connected to a relief valve 61. In this embodiment, high pressure fluid may be pumped into cylinder 53 through inlet 59, causing distortion of plate or diaphragm 56 until a predetermined deflection has been produced whereupon the relief valve opens. Because of the large cross sectional area of port 60, the compressed fluid within cylinder 53 suddenly escapes and the diaphragm or plate 56 returns to the position shown in FIG. 8 at a very fast rate, thereby producing an acoustical sound wave of great intensity.

Referring to FIG. 9, the principles of the invention are shown as applied to an apparatus similar to that shown in FIG. 1. The cylinder 20 is supported on legs 62, and a cylinder 63 extends downwardly from port 23, within which the piston 26 reciprocates. The piston rod 25 extends downwardly through the cylinder 63 and supports at its lower end a hammer 64. The lower end of the cylinder 63 may be provided with a counterbore 65 which vents the high pressure fluid from cylinder 63 when piston 26 reaches the bore 65. From the foregoing it is evident that upon tripping the solenoid valve 40 (FIG. 1), the full pressure of the fluid within cylinder 20 acts on the piston 26, imparting a very great acceleration to the hammer 64.

The embodiment shown in FIG. 10 is similar to the apparatus shown in FIG. 1, except it includes a device 66 for injecting fuel under high pressure into the cylinder 20 when the latter is under pressure from source line 43. An electrical heating element 67 may be mounted in cylinder 20 for the purpose of igniting the fuel as it is injected into cylinder 20. The embodiment shown in FIG. 10 is triggered by the injection of the fuel into cylinder 20, and a slight interval later, the solenoid 40 may be actuated, causing the downward thrust of pistons 26 and 27 when the highly pressurized fluid exhausts from port 23, producing the acoustical wave of great intensity. It is to be understood that the fuel injection means 66 of the embodiment shown in FIG. 10 may, if desired, be incorporated with any of the other embodiments of the invention with equal facility.

Referring to FIG. 11, a cylinder 68 is provided with an axially aligned communicating cylinder 69 mounted thereon. A piston 70 within the cylinder 69 includes a piston rod 71 extending into cylinder 68. The end of rod 71 opposite that connected to piston 70 supports a valve 72 of smaller diameter than that of piston 70, and it cooperates with a port 73 leading from the interior to the exterior of cylinder 68. The piston 70 loosely fits cylinder 69, providing an annular clearance 74 for a purpose to be described later. A spring 75 within cylinder 69 normally forces piston 70 toward a position such that valve 72 closes port 73.

Fluid under pressure is adapted continuously to be supplied to cylinder 68 through a line 76. An exhaust line 77 leading from cylinder 69 includes a solenoid operated valve 78. The diameter of line 77 and the capacity of valve 78 are such as to rapidly exhaust cylinder 69 when valve 78 is operated.

With the apparatus in the condition shown in FIG. 11, pressure fluid fills cylinder 68 and cylinder 69 by virtue of the annular clearance 74, causing valve 72 to effectively close port 73. Upon energizing solenoid valve 78, the pressure within cylinder 69 escapes much more rapidly than fluid under pressure within cylinder 68 can pass through the annular clearance 74. Accordingly, the piston 70 and valve 72 rapidly rise, causing sudden release of the pressure fluid within cylinder 68, thereby producing an acoustical wave of great intensity.

Referring to FIG. 12, the apparatus shown in FIG. 1 is attached to a conical member 79 at its apex. The conical member 79 may be provided with a plate or diaphragm 80, and an orifice 81 may be provided for permitting the escape of the pressure fluid that exhausts from the cylinder 20 after the acoustical sound wave is produced in the same way that it is produced with the structure of FIG. 1. The embodiment of FIG. 12 is primarily intended for use in a body of water. Accordingly, a tube 82 extends from the orifice 81 to a point above the body of water within which the apparatus is submerged. With this arrangement, it is possible to cause the diaphragm 80 to flex downwardly, instantly producing a powerful short impulse of sound, and the pressure fluid within the cone 79 exhausts through the line 82. The diaphragm moves rapidly as it receives the pulse and then returns slowly as the pressure is relieved through the line 82. As a result there is but one impulse.

The amplitude of the acoustical wave may be varied in each embodiment by varying the pressure of the compressed air, and no parts of the device are subject to heavy wear. Furthermore, with the compressed air and fuel mixture, the compressor need not operate at excessive pressures, and the device may be operated exactly when the operator desires by injecting the fuel into the compressed air and a short interval later operating the solenoid valve.

Although the various features of the new and improved pneumatic acoustical device have been shown and described in detail to fully discloses several embodiments of the invention, it will be evident that changes may be made in such details and certain features may be used without others without departing from the principles of the invention.

What is claimed is:

1. A pneumatic acoustical wave-producing repeater device for submersion into a body of water to emit a large amount of acoustical energy into the water in the form of a repeatable pulse for seismic exploration of the earth under the body of water comprising a container having an exhaust port at the end of an inwardly extending cylindrical surface, said exhaust port communicating directly with the water in which said repeater device is submerged; means for feeding air under pressure to said container; means for instantaneously releasing said compressed air from said container, said instantaneous releasing means comprising piston means slidable within said cylindrical surface for containing said compressed air and positionable to uncover said exhaust port; and means connected to said piston means and subjected to air pressure within said container when said container is submerged for sliding said piston means at high acceleration within said cylindrical surface in a direction toward said port prior to uncovering said port, to thereby abruptly open said port by said accelerated piston means travelling in the same direction as the compressed air to be released for instantaneously releasing the compressed air directly into said water for emitting an intense acoustical pulse into the water.

2. A pressure fluid acoustical wave-producing device for operation within a liquid medium to emit an intense, repeatable acoustical impulse into the liquid medium comprising a container; means for feeding fluid under pressure to said container; means for instantaneously releasing said pressure fluid from said container, said instantaneous releasing means comprising a first piston normally closing an exhaust port leading from the interior to the exterior of said container, said exhaust port including a cylindrical surface with said first piston normally within said cylindrical surface in sliding engagement therewith; said exhaust port being submerged directly in the liquid medium when said device is in operation therein; other piston means within said container and being spaced from and rigidly connected to said first piston, said other piston means having areas facing generally in opposite directions; means for applying pressure fluid within said container to an area of said other piston means facing in a direction for holding said first piston within said cylindrical surface to contain pressure fluid in said container; and means for conducting pressure fluid within said device to another area of said other piston means facing in the opposite direction for accelerating said first piston means within said cylindrical surface before opening said exhaust port for suddenly releasing pressure fluid out of said exhaust port directly into the liquid medium to emit an intense acoustical impulse therein.

3. A pressure fluid acoustical wave-producing device comprising a container having a cylindrical portion and a vent to the exterior of said container communication with said cylindrical portion; means for feeding fluid under pressure to said container; means for instaneously releasing said pressure fluid from said container, said instantaneous releasing means comprising a first piston sliding within said cylindrical portion and normally positioned remotely from said vent, said first piston normally blocking the path through said cylindrical portion to said vent leading from the interior to the exterior of said container; a second piston connected to said first piston, said second piston having an effective surface exposed to the pressure fluid in said container larger than the effective area of said first piston exposed thereto for holding said first piston in its normal position; means for applying pressure within said container to the opposite side of said second piston from said effective surface for sliding said first piston within said cylindrical surface with great acceleration away from its normal position toward said vent and then beyond said vent to open fully and abruptly said vent; and means for returning said first piston toward said position effecting the closing of said vent by said first piston.

4. A pneumatic acoustical wave-producing device comprising a container having axially aligned first and second cylindrical ports in opposite ends thereof; means forming a chamber that is in communication with the interior of said container through the first of said ports; spaced first and second piston means for closing said ports respectively; other means for connecting the interior of said container and said chamber including a solenoid-operated valve for equalizing the pressure on opposite sides of said first piston means for accelerating said first and second piston means, whereby said second piston means opens the second port opposite that communicating with said chamber; and means for urging said first and second piston means toward a position to close both of said ports.

5. A pneumatic acoustical wave-producing device comprising a container having axially aligned ports in opposite end walls thereof; means forming a chamber that is in communication with the interior of said container through one of said ports; another port being vented to the exterior of said container, spaced first and second piston means for closing said ports; and solenoid-operated valve means which in one position vents said chamber and passes high pressure fluid to the interior of said container for filling said container with compressed air under high pressure, and in another position connects said chamber to the interior of said container for accelerating said first and second piston means for suddenly opening said other port to release said compressed air abruptly through said other port.

6. A pneumatic acoustical wave-producing device comprising a container having axially aligned ports in opposite end walls thereof; means forming a chamber that is in communication with the interior of said container through one of said ports; spaced first and second piston means for closing said ports; other means for connecting the interior of said container and said chamber including a solenoid valve for equalizing the pressure on opposite sides of one of said piston means, whereby the other piston means opens the port opposite that communicating with said chamber; and means for limiting the active stroke of said first and second piston means.

7. A compressed gas acoustical wave-producing device comprising a container having axially aligned ports in opposite end walls thereof; means forming a chamber that is in communication with the interior of said container through one of said ports; another of said ports being vented to the exterior of said container, spaced first and second piston means for closing said ports; control valve means which in one position vents said chamber and passes high pressure gas to the interior of said container for filling said container with compressed gas under high pressure, and in another position connects said chamber to the interior of said container for accelerating said first and second piston means for suddenly opening said other port to release said high pressure gas suddenly through said other port to the exterior of said container; and adjustable means for limiting the active stroke of said first and second piston means.

8. A pneumatic acoustical wave-producing device comprising a container having axially aligned ports in opposite end walls thereof; means forming a chamber that is in communication with the interior of said container through one of said ports; another of said ports communicating with the exterior of said container, spaced piston means for closing said ports; control valve means which in one position vents said chamber and passes high pressure fluid to the interior of said container, and in another position connects said chamber to the interior of said container; resilient means normally urging said piston means toward a position to close both of said ports; and adjustable means for limiting the active stroke of said piston means.

9. A pneumatic acoustical wave-producing device for abruptly releasing compressed air into a liquid medium to emit an intense acoustical impulse therein comprising a container having axially aligned ports in opposite ends thereof; means forming a chamber that is adapted to be in communication with the interior of said container through one of said ports; the other of said ports opening out through an end of said container for direct communication with a liquid medium; spaced piston means for closing both of said ports; means for feeding compressed air into said container; and fluid conducting means for connecting the interior of said container and said chamber for raising the pressure in said chamber, whereby said piston means opens out through said other port opposite that communicating with said chamber for abruptly releasing compressed air from said other port into the liquid medium to emit an intense acoustical impulse therein.

10. A pneumatic acoustical wave-producing device for emission of acoustical energy into a liquid medium in the form of an intense impulse, said device being capable of repeating the emission of intense acoustical impulses and comprising a container; means for feeding compressed air under pressure into said container; means for instantaneously releasing said compressed air from said container, said instantaneous releasing means comprising piston means normally closing a large exhaust port leading from the interior to the exterior of said container, said large exhaust port being located at one end of said container for direct communication with the liquid medium into which said intense impulses are emitted; other piston means rigidly connected to said piston means and initially subjected on one side to the pressure of compressed air within said container for holding said piston means in the normally closed position; a cylinder extending into said container means from said port and within which said piston means reciprocates; and means for suddenly applying compressed air to the other side of said other piston means for accelerating said piston means along said cylinder and out through said port at the end of said container for suddenly releasing the compressed air into the liquid medium to emit an intense acoustical impulse therein.

11. A pneumatic acoustical wave-producing device comprising a container; means for feeding fluid under pressure to said container; means for instantaneously releasing said pressure fluid from said container, said instantaneous releasing means comprising piston means normally closing an exhaust port leading from the interior to the exterior of said container; means connected to said piston means and subjected to the pressure fluid within said container for operating said piston means; an igniting means within said container; and means for injecting high pressure fuel into said container when it is filled with high pressure fluid.

12. A pneumatic acoustical wave-producing device comprising a container having axially aligned ports in opposite end walls thereof; means forming a chamber that is in communication with the interior of said container through one of said ports; spaced piston means for closing said ports; other means for connecting the interior of said container and said chamber, whereby said piston means opens the port opposite that communicating with said chamber; an igniting means within said container; and means for injecting high pressure fuel into said container when it is filled with high pressure fluid.

13. A pneumatic acoustical wave-producing device for use beneath the surface of a body of water comprising a container; means for feeding fluid under pressure to said container; means for instantaneously releasing said pressure fluid from said container, said instantaneous releasing means comprising piston means normally closing an exhaust port leading from the interior to the exterior of said container; means connected to said piston means and subjected to the pressure fluid within said container for operating said piston means; a hollow chamber connected to said container such that the release fluid therefrom passes in an uninhibited manner into said chamber; diaphragm means closing the base of said chamber; vent means leading from the interior to the exterior of said chamber; and tube means leading from said vent means on the exterior of said chamber to a point above the surface of the body of water within which said device is submerged.

14. A pressure gas operated acoustical pulse wave-producing device for seismic exploration of the world's crust under bodies of water comprising a container adapted to be placed in a body of water, supply means for feeding gas under pressure into said container, said container having an exhaust port leading from the interior of said container, a vent leading to the exterior of said container and a cylinder extending from said port to said vent for providing an escape path for the gas to escape from said container through said port, along said cylinder and out of said vent, first piston means reciprocating within said cylinder between said port and said vent, second piston means spaced from and connected to said first piston means and subject to the pressure within said container, said second piston means having a larger effective area than said first piston means for normally holding said first piston means adjacent to said port for blocking said port, gas conducting means providing a path for flow of gas from one side to the other side of said second piston means for equalizing the pressure on opposite sides of said second piston means, and valve means for opening said gas conducting means to equalize the pressure on opposite sides of said second piston means for permitting the gas pressure to impart very great acceleration to said first piston means in moving along said cylinder from said port to said vent for suddenly releasing said gas to emit a large amount of acoustical energy into the water in the form of a clean, repeatable pulse.

15. A pressure gas operated acoustical wave-producing device comprising a container, means for supplying gas to said container and for operating said device including a compressor, a flexible line extending from said compressor for supplying gas under pressure into said container, said container having an exhaust port leading from the interior of said container, a vent leading to the exterior of said container and a cylinder extending between said port and vent, first piston means reciprocating within said cylinder between said port and said vent, second piston means connected to and spaced from said first piston means and subject to the pressure within said container, said second piston means having a larger effective area than said first piston means for normally holding said first piston means adjacent to said port for blocking said port, a solenoid-operated valve for initiating a flow of gas from one side to the other side of said second piston means to equalize the pressure on opposite sides of said second piston means for releasing said first piston means with very great acceleration toward said vent, thereby suddenly to release the compressed gas when said first piston means reaches said vent.

16. A gas operated acoustical pulse wave-producing device for seismic exploration of the world's crust under bodies of water comprising a container adapted to be placed in a body of water, a compressor and a flexible line extending from said compressor for supplying compressed air into said container, said container having means defining a cylindrical surface, first piston means sliding within said cylindrical surface, said cylindrical surface defining a passage for gas to escape from the interior to the exterior of said container, second piston means spaced from and connected to said first piston means and subject to the pressure within said container, said second piston means having a larger effective area than said first piston means for normally holding said first piston means within said cylindrical surface for blocking said escape passage, fuel injecting means for injecting fuel into said container after compressed air has been supplied into said container, igniting means for igniting said fuel for combustion within said container, and means for applying the pressure on opposite sides of said second piston means to release said first and second piston means, when said applying means is actuated, whereby said first piston means slides along said cylindrical surface with great acceleration for abruptly opening said escape passage and emits a large amount of acoustical energy into the water in the form of a clean, repeatable pulse.

17. A powerful acoustical impulse generator repeater device for suddenly releasing pressurized gas into a liquid medium to emit a large amount of acoustical energy into the liquid medium in the form of an intense pulse in response to an electrical signal comprising container means for holding pressurized gas, means for introducing pressurized gas into said container means, vent means to the exterior of said container means for discharging the pressurized gas therefrom into the liquid medium, movable closing means for closing said vent means, said device having an acceleration distance for said closing means to move before opening said vent means, said closing means being exposed to the pressure of said pressurized gas in said container means for providing great force on said closing means urging said closing means toward movement through said acceleration distance, means for holding said closing means against the force of said pressurized gas, and electrically operated means for releasing said holding means in response to an electrical signal for permitting the force of said pressurized gas to impart a very great acceleration to said closing means for suddenly opening said vent means to release said pressurized gas abruptly into the liquid medium for generating an intense acoustical impulse.

18. A powerful acoustical impulse generator repeater device for abruptly releasing pressurized gas in response to an electrical signal to provide an intense, repeatable acoustical pulse comprising container means for holding gas under pressure, means for feeding gas under pressure into said container means, vent means to the exterior of said container means for discharging the pressurized gas from said container means, first piston means for closing said vent means and having a normal position at a distance from said vent means, said first piston means having a first surface facing toward said vent means and a second surface on the opposite side of said first piston means exposed to the pressurized gas in said container means for urging said first piston means to move along said distance toward said vent means, second piston means spaced from said first piston means, interconnection means extending between said first and second piston means for connecting said first and second piston means together, said second piston means having third and fourth surfaces on opposite sides thereof, said third surface effectively facing in the opposite direction from said second surface and having a larger effective area than said second surface exposed to the pressurized gas in said container means for holding said first piston at its normal position, and control means responsive to an external signal for applying the pressurized gas to said fourth surface for equalizing the pressure against said third and fourth surfaces thereby to accelerate said first piston means along said distance with very great acceleration for suddenly opening said vent means to discharge said pressurized gas from said vent means with an intense acoustical pulse.

19. In a system for producing underwater acoustic signals in a body of water, acoustical repeater apparatus for emitting a large amount of acoustic energy into the water in a repeatable pulse comprising container means adapted to be placed in the water for holding gas under high pressure therein, vent means for discharging the gas from the container means into the water, valve means for closing said vent means and adapted to be accelerated before opening said vent means, operating means connected to said valve means for controlling said valve means, said operating means having first and second areas effectively facing in opposite directions, means for applying gas pressure to said first area for holding said valve means closed, means for applying gas pressure to said second area for overcoming the holding force of said first area for accelerating said valve means for suddenly dischaging said high pressure gas from the container means into the water to emit a large acoustic energy pulse, means for reclosing said valve means, and feeding means for refilling said container means for repeated operation.

20. In a system for seismic exploration of the world's crust adjacent to bodies of water, acoustical repeater apparatus adapted for emitting intense acoustical energy pulses into the water and for cyclically repeating the emission of the intense acoustical energy pulse into the water comprising container means adapted to be placed in the water for holding gas under high pressure therein, port means for discharging the gas from the container means into the water, valve means for closing said port means and adapted to be accelerated along a distance before opening said port means for abruptly discharging the high pressure gas from said container means into the water for emitting an intense acoustical energy pulse into the water, means for returning said valve means along said distance for re-closing said port means, and feeding means for refilling said container means for cyclically repeating the emission of the intense acoustical energy pulse into the water.

21. In a system for seismic surveying of the earth's crust adjacent to bodies of water, acoustical repeater apparatus adapted for repeatedly emitting abrupt powerful acoustical energy pulses into the water comprising container means adapted to be put into the water for holding gas under high pressure, means for introducing compressed air into said container means, means for introducing fuel into said container means and for burning said fuel therein, and means for suddenly releasing the high pressure gas products of combustion in response to an external signal to emit an abrupt powerful acoustical energy pulse into the water.

22. Underwater acoustical impulse generator repeater apparatus for repeatedly emitting acoustical impulses into a body of water for seismic exploration of the earth adjacent to the body of water comprising container means for holding gas under high pressure; means for suddenly releasing the high pressure gas from said container including vent means to the exterior of said container means, a cylinder surface extending for a distance away from said vent means, movable piston means for suddenly opening said vent means, said movable piston means having a first piston in sliding engagement with said cylinder surface for closing said vent means and normally positioned at a distance from said vent means, said first piston having an effective area exposed to the pressure of the gas in said container means for urging said first piston to accelerate along said cylinder surface toward said vent means, a second piston spaced from said first piston, rigid interconnection means extending between said first and second piston for rigidly securing them together, said second piston having an effective area which is larger than the effective area of said first piston and which is exposed to the pressure of the gas in said container means and which faces in the opposite direction from the effective area of said first piston for holding said first piston in its normal position at said distance away from said vent means, and means for raising the pressure on the opposite side of said second piston means from said effective area thereof for releasing said movable piston means for very great acceleration as said first piston travels along said cylinder surface toward said vent means for suddenly releasing said high pressure gas when said vent means is abruptly opened after said very great acceleration has occurred, thereby to emit an acoustical impulse into the water, said movable piston means having a stop surface of substantial area exposed to the water and said container means having a stop surface exposed to the water and in opposed relationship to the stop surface of said movable piston means for decelerating said movable piston means by forcing the water out from between said stop surfaces as said stop surfaces approach each other, means for returning said movable piston means to initial position, and means for refilling said container means with fluid for repeating the operation.

23. In a sound impulse generator a quick high-pressure gas release means comprising a container having a first and a second chamber; piston means separating said first and said second chambers; means for introducing gas at high pressure into said first chamber to urge said piston means toward said second chamber; valve means connected to said piston means for opening said container; and means for introducing high-pressure gas into said second chamber thereby to raise the pressure in said second chamber for abruptly releasing said valve means for quickly opening said container, whereby high pressure gas is retained in said container until the high pressure gas is introduced into said second chamber.

24. A pneumatic acoustical impulse repeater device for submersion into a body of water for repeating the abrupt release of compressed air directly into the water to emit intense acoustical impulses into the water for seismic exploration for the earth under the body of water comprising container means having a cylindrical surface therein with a port at the end of said cylindrical surface for directly opening into a body of water when said repeater device is submerged therein, means for supplying compressed air to said container means, first piston means slidable within said cylindrical surface to an initial axial position retracted from said port for containing said compressed air within said container means and movable to a second axial position beyond said port for opening said port directly into the water, said container means having a second cylindrical surface, second piston means slidable within said second cylindrical surface, means rigidly connecting said second piston means to said first piston means for controlling the motion of said first piston means, means for applying compressed air to one side of said second piston means for holding said first piston means in its initial retracted position, said container means having a region adjacent to the other side of said second piston means initially of lower pressure than that applied to said one side, and means for introducing pressure into said region adjacent to the other side of said second piston means for sliding said first piston means with rapid acceleration before said first piston means moves into its second axial position for suddenly opening said port to abruptly release compressed air directly into the water.

25. An acoustical impulse producing device adapted to be submerged into a body of water for emission of a large amount of acoustical energy into the water in the form of an intense impulse and adapted to repeat the emission of intense acoustical impulses into the water while said device remains submerged therein, said device comprising container means having an outwardly extending cylindrical surface with an exhaust port at the end of said cylindrical surface for directly communicating with the water, means for charging said container means with gases under high pressure, piston means slidable within said cylindrical surface to a position remote from said port for retaining the high pressure gases within said container means and positionable to open said exhaust port, means for applying gas pressure to a first area of said piston means for holding said piston means remote from said port, and means for applying gas pressure to another area of said piston means facing in the opposite direction from said first area for sliding said piston means at high acceleration along said cylindrical surface toward said port prior to uncovering said port, thereby to open said port abruptly and fully to discharge said high pressure gases directly into the water for emitting an intense acoustical impulse into the water.

References Cited by the Examiner
UNITED STATES PATENTS

| | | | |
|---|---|---|---|
| 1,097,859 | 5/1914 | Hecht | 340—12 |
| 1,611,740 | 12/1926 | Hahnemann | 340—12 |
| 1,618,982 | 3/1927 | Hahnemann et al. | |
| 1,689,574 | 10/1928 | Williams | 340—12 |
| 2,083,695 | 6/1937 | Dull | 102—25 X |
| 2,083,705 | 6/1937 | Harris | 102—25 |
| 3,041,970 | 7/1962 | Foster | 102—25 |
| 3,090,307 | 5/1963 | Niekrasz | 102—25 |

BENJAMIN A. BORCHELT, *Primary Examiner.*

CHESTER L. JUSTUS, *Examiner.*

M. KRAUS, GERALD H. GLANZMAN,
*Assistant Examiners.*